(12) United States Patent
James et al.

(10) Patent No.: US 7,036,080 B1
(45) Date of Patent: Apr. 25, 2006

(54) METHOD AND APPARATUS FOR IMPLEMENTING A SPEECH INTERFACE FOR A GUI

(75) Inventors: Frankie James, Sunnyvale, CA (US); Jeff Roelands, San Jose, CA (US)

(73) Assignee: SAP Labs, Inc., Palo Alto, CA (US)

( * ) Notice: Subject to any disclaimer, the term of this patent is extended or adjusted under 35 U.S.C. 154(b) by 665 days.

(21) Appl. No.: 09/997,704

(22) Filed: Nov. 30, 2001

(51) Int. Cl.
*G09G 5/00* (2006.01)
(52) U.S. Cl. .................. 715/728; 715/716; 715/765; 715/520; 704/275; 704/276
(58) Field of Classification Search ........ 345/727–729, 345/716–717, 866, 865, 789; 704/275, 270, 704/260, 276; 715/520, 516, 530, 716, 727, 715/728, 764, 765, 766, 767
See application file for complete search history.

(56) References Cited

U.S. PATENT DOCUMENTS

| | | | | |
|---|---|---|---|---|
| 5,874,959 | A * | 2/1999 | Rowe | 345/634 |
| 5,884,249 | A * | 3/1999 | Namba et al. | 704/9 |
| 6,081,266 | A * | 6/2000 | Sciammarella | 715/727 |
| 6,345,111 | B1 * | 2/2002 | Yamaguchi et al. | 382/118 |
| 6,353,809 | B1 * | 3/2002 | Takahashi et al. | 704/235 |
| 6,670,970 | B1 * | 12/2003 | Bonura et al. | 345/768 |
| 2002/0055844 | A1 * | 5/2002 | L'Esperance et al. | 704/260 |
| 2002/0069046 | A1 * | 6/2002 | Bress et al. | 704/1 |
| 2002/0077829 | A1 * | 6/2002 | Brennan et al. | 704/275 |
| 2002/0190946 | A1 * | 12/2002 | Metzger | 345/156 |
| 2003/0033151 | A1 * | 2/2003 | Vozick et al. | 704/275 |
| 2003/0163321 | A1 * | 8/2003 | Mault | 704/270 |

FOREIGN PATENT DOCUMENTS

| | | | |
|---|---|---|---|
| EP | 0 607 615 A1 | | 7/1994 |
| JP | 2001-134533 | * | 5/2001 |

OTHER PUBLICATIONS

IBM TDB, Visual Dialog Showing Speech Interaction Intelligent Agent, pp. 237-240, Jan. 1, 1996.*
Tomonari Kamba et al, "Using small screen space more efficiently," Apr. 13-18, 1996, CHI 96.*
Joel F. Bartlett, "Transparent Controls for Interactive Graphics", WRL Technical Note TN-30, Digital Equipment Corp., Palo Alto, CA, Jul. 1992, 13 pages.

(Continued)

*Primary Examiner*—Tadesse Hailu
(74) *Attorney, Agent, or Firm*—Finnegan, Henderson, Farabow, Garrett and Dunner, L.L.P.

(57) ABSTRACT

A method and apparatus for providing speech control to a graphical user interface (GUI) divide a GUI into a plurality of screen areas; assign the screen areas priorities; receive a first audio input relating to the selection of one of the objects in the interface; determine the one of the screen areas having the highest priority and including a first object matching the first audio input; and select the first object in the determined screen area if the determined screen area only contains one object matching the first audio input. The method and apparatus also select one of the objects that matches the first audio input in the determined screen area if the determined screen area contains more than one object that matches the first audio input.

75 Claims, 6 Drawing Sheets

OTHER PUBLICATIONS

Eric A. Bier, et al., "Toolglass and Magic Lenses: The See-Through Interface", The 20th Annual Conference on Computer Graphics, Anaheim, CA, 1993, 73-80.

Beverly L. Harrison, et al., "An Experimental Evaluation of Transparent User Interface Tools and Information Content", The 8th ACM Symposium on User Interface and Software Technology, Pittsburgh, PA, 1995, 81-90.

Bill Manaris, et al., "SUITEKeys: A Speech Understanding Interface for the Motor-Control Challenged", The Third International ACM Conference on Assistive Technologies, Marina del Rey, CA, 1998, 11 pages, at http://www.cs.cofc.edu/~manaris/publications/suitekeys.html.

David R. McGee, et al., "Creating Tangible Interfaces by Augmenting Physical Objects with Multimodal Language", ACM Press, International Conference on Intelligent User Interfaces, Santa Fe, NM, 2001, 113-119.

Robert Moore, et al., "CommandTalk: A Spoken-Language Interface for Battlefield Simulations", Fifth Conference on Applied Natural Language Processing, 1997, 1-9.

Neil Scott, et al., "The TASCloud: A networked total access system", Technology and Persons with Disabilities, 1999, 4 pages, at http://www.jsrd.or.jp/dinf_us/csun$_{13}$ 99/session0109.html.

"Conversational Computing Corporation", Conversay, 2001, 18 pages, at http://www.conversay.com.

"Dragon, Naturally Speaking 5", User's Guide, Dragon Systems, Inc., Lernout & Hauspie, Aug. 2000, 214 pages.

* cited by examiner

```
<DIV id=ChannelArea>
   <DIV class=headerElement id=CH onclick="handleOnHeaderClick( )">
      <DIV class=icon>
         <IMG class=IconAreaOpen id=CHLeft src="1x1.gif">
      </DIV>
      <DIV class=label>In Use</DIV>
   </DIV>
   <DIV class=BodyExpanded id=CB>
      <DIV class=blockElementActive id=Start onclick="handleOnChannelClick( 0 )">
         <DIV class=icon>
            <IMG class=IconHome id=Start_Left src="1x1.gif">
         </DIV>
         <DIV class=label>Start Page</DIV>
      </DIV>
      <DIV class=blockElementPassive id=C1 onclick="handleOnChannelClick( 1 )">
         <DIV class=icon title=Airlines>
            <IMG class=IconWebSource id=C1_Left src="1x1.gif">
         </DIV>
         <DIV class=label>Airlines</DIV>
         <DIV class=button onclick="handleOnChannelClose( 1 )">
            <IMG class=IconChannelClose src="1x1.gif">
         </DIV>
      </DIV>
      <DIV class=blockElementActive id=C2 onclick="handleOnChannelClick( 2 )">
         <DIV class=icon title="Vacation Planner">
            <IMG class=IconWebSource id=C2_Left src="1x1.gif">
         </DIV>
         <DIV class=label>Vacation Planner</DIV>
         <DIV class=button onclick="handleOnChannelClose( 2 )">
            <IMG class=IconChannelClose src="1x1.gif">
         </DIV>
      </DIV>
   </DIV>
</DIV>
```

FIG. 4A

Grammar: "In Use"

| Voice Command | ID / Reference: | Event: | Action: |
|---|---|---|---|
| ---> "Start Page" | "Start" | "onclick()" | "handleOnChannelClick( 0 )" |
| ---> "Airlines" | "C1" | "onclick()" | "handleOnChannelClick( 1 )" |
| ---> "Vacation Planner" | "C2" | "onclick()" | "handleOnChannelClick( 2 )" |

FIG. 4B

METHOD AND APPARATUS FOR IMPLEMENTING A SPEECH INTERFACE FOR A GUI

FIELD OF THE INVENTION

This invention relates to the field of graphical user interfaces (GUIs) for PC systems, and, more specifically, to a speech interface for a GUI and a method for interfacing with a GUI using the same.

BACKGROUND OF THE INVENTION

Many business applications use GUIs to allow users to interface with the applications for performing a number of operations. Typically, GUIs are mouse- and keyboard-intensive, which can be problematic or even impossible to use for many people, including those with physical disabilities. One type of interface that avoids a mouse or keyboard is a speech interface. A speech interface allows audio input of commands to communicate with applications, and can be used by anyone who wishes to speak to their system, such as mobile users with inadequately-sized keyboards and pointing devices.

One of the main challenges for a speech interface is specifying the desired target of an audio input, especially in a GUI where multiple selectable objects such as windows, text fields and icons, can have the same label or name. In these situations, it is important for both the computer system and the user to know the current focus when an audio input is issued, to help the system resolve possible ambiguities and to help the user keep track of what he is doing.

One type of ambiguity is called "target ambiguity," where the target of a user's action is ambiguous and must be resolved. In a physical interaction involving a mouse or other pointing device, users specify the target of their actions directly by clicking on the selectable object of interest. Target ambiguities caused by selectable objects that have the same name are resolved through the physical interaction. With audio input, users do not have a way to resolve target ambiguities physically; therefore, the target ambiguity must be handled in some other way.

Traditional speech interfaces for GUIs typically emulate the keyboard and mouse directly using spoken equivalents; however, they are slow to operate and often take quite a bit longer to select an object than conventional mouse or keyboard techniques. Conventional speech interfaces lack public acceptance due to inaccurate control of the interfaces.

Other traditional speech interfaces for GUIs combine audio input with alternative pointing devices such as head- or eye-tracking technologies. However, conventional alternative pointing devices require calibration and expensive equipment, making them difficult to set up and use on computers shared by multiple people.

Still other traditional speech interfaces provide object selection solely by audio input. These speech interfaces explore a current window or current screen area to find selectable objects that match the audio input. One limitation of these speech interfaces is that they only explore the current screen area to find selectable objects matching the audio input. They do not explore the other screen areas for a match to the audio input. Instead, additional audio inputs are required to look for matches to the audio input in screen areas other than the current screen area. These additional required audio inputs decrease the efficiency of conventional speech interfaces.

Another limitation of these traditional speech interfaces involves their capability to resolve target ambiguity. These interfaces mark selectable objects matching the audio input with opaque icons for subsequent selection. However, placing an opaque icon adjacent to the selectable object often pushes screen elements out of place and distorts the screen layout. Furthermore, overlaying the selectable object with an opaque icon often obscures the underlying text and graphics. Finally, displaying opaque icons for all objects that match each other often clutters the screen. Thus, traditional speech interfaces often fail to maintain the integrity of screen layout and the view of the text and graphics of the selectable objects when resolving target ambiguities.

SUMMARY OF THE INVENTION

Methods and apparatus consistent with the present invention provide a speech interface for a GUI via a computer system.

Consistent with the present invention, a method for providing speech control to a GUI containing objects to be selected includes dividing the GUI into a plurality of screen areas; assigning priorities to the screen areas; and receiving a first audio input relating to the selection of one of the objects in the GUI. The method further includes determining one of the screen areas that has the highest priority and includes a first object matching the first audio input; selecting the first object, if the determined screen area only contains one object matching the first audio input; and using a second input to select one of the objects that matches the first audio input in the determined screen area, if the determined screen area contains more than one object that matches the first audio input.

BRIEF DESCRIPTION OF THE DRAWINGS

The accompanying drawings, which are incorporated in and constitute a part of this specification, illustrate an embodiment of the invention and together with the description, serve to explain the principles of the invention.

FIG. 4A is a diagrammatic illustration showing a document of HTML data which can be utilized to implement the method and system of the present invention;

FIG. 4B is a diagrammatic illustration of a data structure which can be utilized to implement the method and system of the present invention.

DETAILED DESCRIPTION

Reference will now be made in detail to exemplary embodiments of the invention illustrated in the accompanying drawings. Wherever possible, the same reference numbers in different drawings refer to the same or like parts.

A. Overview

Methods and apparatus consistent with the invention provide a speech interface for a GUI. One embodiment includes dividing a GUI for a system into screen areas containing one or more selectable objects, and assigning priorities to the screen areas based on some criteria, for example, usage. The screen area with the highest priority is indicated, for example, by visual output such as highlighting. Next, an audio input is received, and its receipt confirmed, for example, by an audio output. In response to the received audio input, a system determines the screen area having (1) the highest priority and (2) a selectable object matching the audio input. If that screen area only contains one such object, then the system selects that object. However, if that screen area contains more than one matching object, then the system uses a second input to select one of the objects matching the audio input from that screen area.

Using a second input to select one of the objects that match an audio input includes marking the objects that matched the audio input, such as with icons; receiving a second audio input relating to the selection of one of the marked objects; and selecting the marked object that best matches the second audio input. The icons may be semitransparent and may be laid over the objects. In addition, the icons may include numbered labels and may be removed from the screen area upon object selection.

B. Architecture

Figure 1:
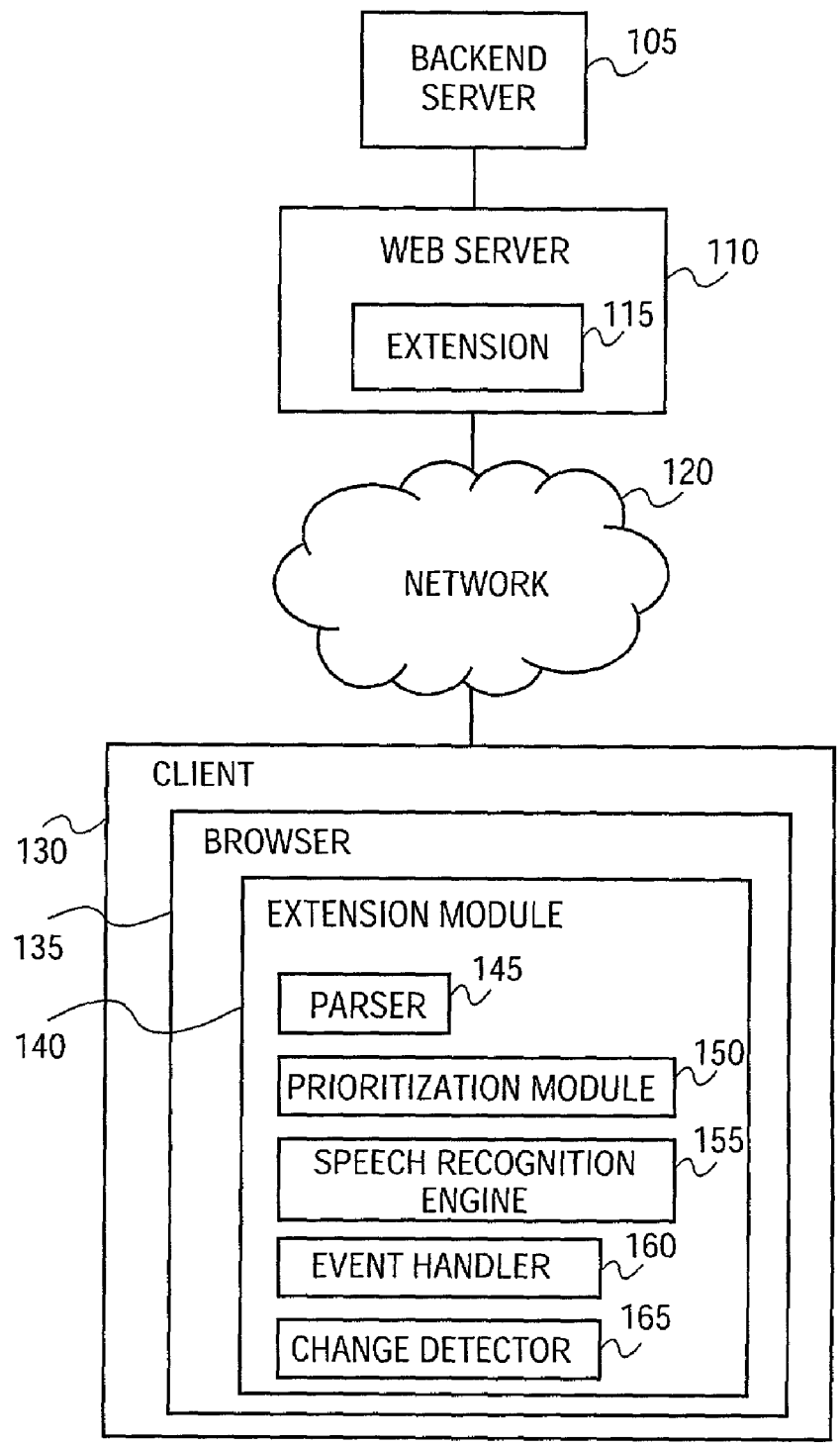
FIG. 1 is a block diagram of a computer system on which methods and apparatus consistent with the invention may be implemented.

FIG. 1 is a block diagram of a computer system 100 on which methods and apparatus consistent with the invention may be implemented. FIG. 1 shows, for example, a client/server computer system wherein a client computer 130 is connected to a Web server 110 via a network 120. Network 120 may be a local area network (LAN), a wide area network (WAN), or a large multi-user network like the Internet. In one embodiment, the Web server 110 is also connected to a backend server 105. Computer system 100 is suitable for use with the C++ programming language, although one skilled in the art will recognize that methods and apparatus consistent with the invention may be applied to other suitable user environments.

Figure 2:
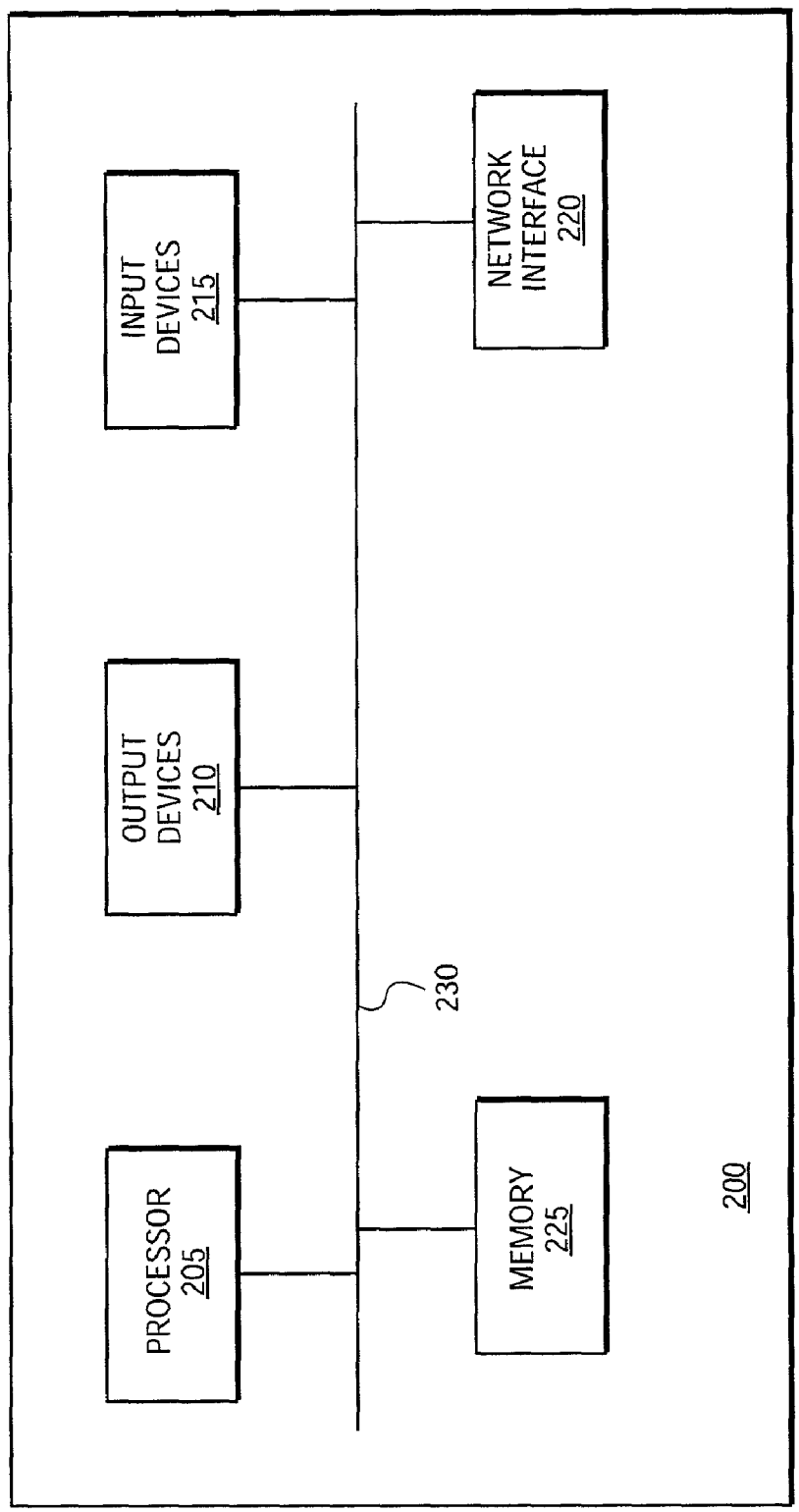
FIG. 2 is a block diagram showing components of a computer device which can be used to implement the FIG. 1 computer system.

FIG. 2 shows a block diagram of components of a computer which could be used to implement the client or server computers in FIG. 1 computer system 100. Computer 200 includes several components that are all interconnected via a system bus 230. Computer 200 communicates with other user's computers on network 120 via a network interface 220, examples of which include Ethernet or dial-up telephone connections.

Computer 200 contains a processor 205 connected to a memory 225. Processor 205 may be a microprocessor or any other micro-, mini-, or mainframe computer. Memory 225 may comprise a RAM, a ROM, a video memory, or mass storage. The mass storage may include both fixed and removable media (e.g., magnetic, optical, or magnetic optical storage systems or other available mass storage technology). Memory 225 may contain a program, such as a web browser, and an application programming interface.

A user typically provides information to computer 200 via input devices 215, such as a conventional microphone. In return, information is conveyed to the user via output devices 210, such as a conventional visual display device and an audio display device. Output devices 210 and input devices 215 connect to computer 200 via appropriate I/O ports. The input and output devices may be physically connected to system bus 230, or could communicate via some other connection, such as by use of an infrared or other wireless signal.

The client computer 130 may run a "browser" 135, which is a software tool used to access a Web server 110. A Web server 110 operates a web site which supports files in the form of documents and pages. Browser 135 sends out requests to Web server 110 via network 120, and Web server 110 returns a responses to browser 135 via network 120. Browser 135 acts upon those responses such as by displaying content to the user. The content portion of the responses can be a "Web page" expressed in hypertext markup language (HTML) or other data generated by the Web server 110.

One exemplary computer system 100 that can implement the present invention is the SAP R/3 ™ system. In that system, a backend server 105, such as an SAP R/3™ server, contains program applications that can be performed on client computer 130. Web server 110, such as an Internet Transaction Server (ITS) from SAP, reads the application content from the backend server 105 and translates the application content into HTML.

An extension 115 in the Web server 110 structures the HTML content. The extension 115 is an application program run on Web server 110 that structures HTML content by, for example, defining control groupings and data types within the HTML content. Extension 115 adds data to the HTML content via the form of traditional meta-data tags or XML type structured data. The extension 115 may be written in programming languages such as Javascript™, Visual Basic™, C++ and C.

On the client side, in the exemplary system, the client computer runs Windows™ O/S to create a multi-framed environment. Browser 135 receives the structured HTML content from the Web server 110 via network 120. An extension module 140 within browser 135 then voice-enables the received HTML content. Extension module 140 consists of program applications to be performed on the client's processor 205 for voice-enabling the HTML content. In the exemplary system, the program applications include a parser 145, a prioritization module 150; a speech recognition engine 155; an event handler 160; and a change detector 165. These applications may be written in languages such as Javascript™, Visual Basic™, C++ and C.

Extension module 140 reads in the structured HTML content and identifies elements in the content and their location within the content structure. Parser 145 then parses each element using standard parsing techniques, such as DOM-parsing in Javascript™. For instance, upon identification of a group of two items, such as a label tag and text data, parser 145 extracts text data out of the label. The extracted text data can include identifying text, an object identification, an event and an action associated with the element (e.g. an action associated with an on-click event). Extension module 140 then assigns a voice command, such as the identifying text, for the element.

Extension module 140 then loads the element data into a prioritization module 150. Prioritization module 150 stores element data, such as the associated voice command, the object identification, the event, and the action in a data structure consisting of categorized areas. The data structure and categories correspond to the structure and groups of the originally read content. By storing the element data in categories, or grammars, the prioritization module 150 can associate more than one element.

Figure 3:
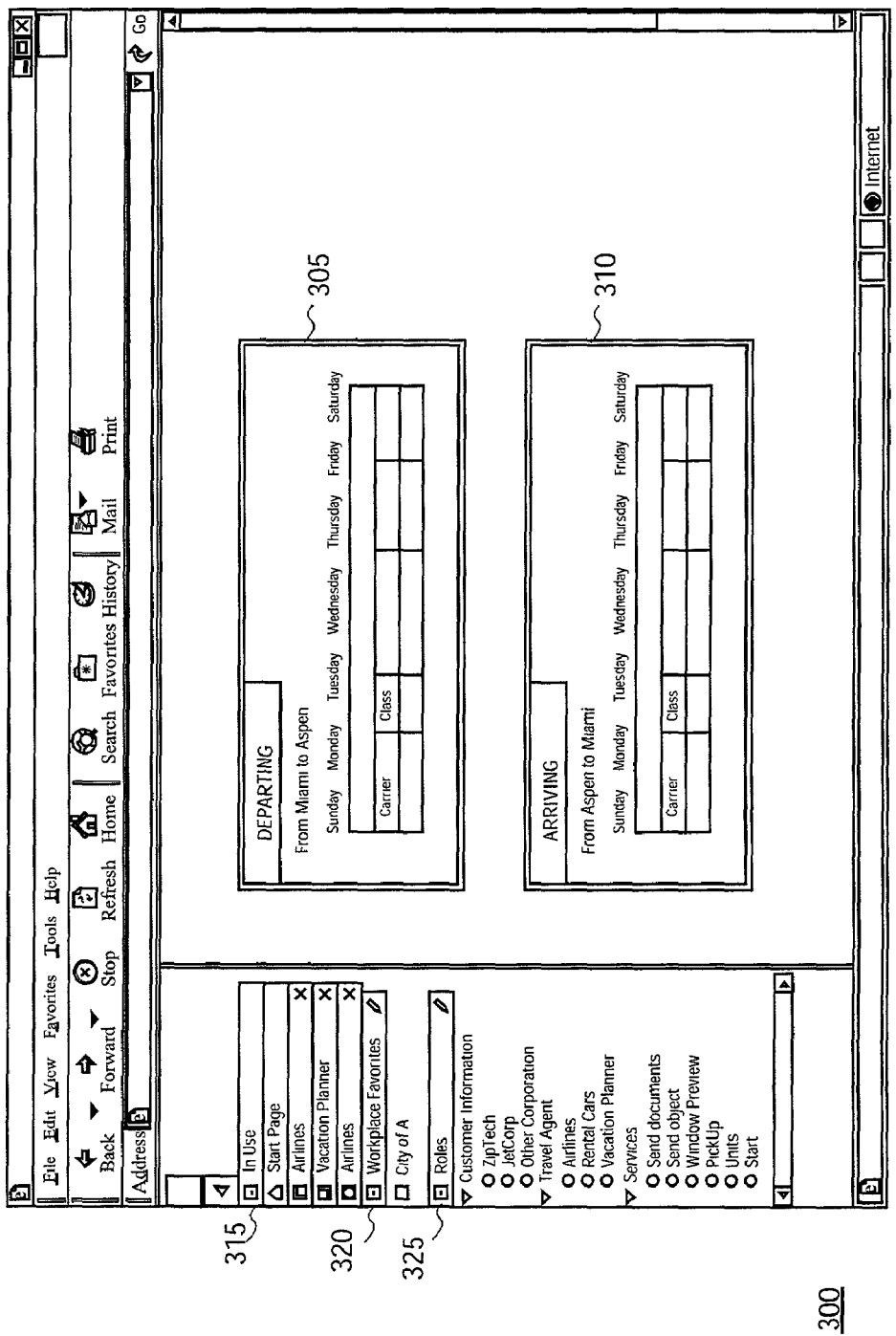
FIG. 3 is a diagrammatic illustration of a GUI window which can be utilized to implement the method and system of the present invention.

As an illustrative example, FIG. 3 shows an exemplary GUI 300 displaying content generated by a server to the user. GUI 300 consists of five screen areas. On the left, GUI 300 shows the "In Use" area 315, the "Workplace Favorites" area 320, and the "Roles" area 325. On the right, GUI 300 shows two areas, the "Departing" area 305 and the "Arriving" area 310. FIG. 4A depicts an example of HTML content 400 associated with "In Use" area 315 of FIG. 3. After extension module 140 reads through the HTML elements associated with the objects contained within "In Use" area 315, it loads the parsed element data into the "In Use" category, or grammar, in prioritization module 150. FIG. 4B shows an example of grammar structure 450 in prioritization module 150 having categorized element data.

After storing the element data into grammars, prioritization module 150 assigns a priority value to each of the grammars. This effectively assigns a priority value to each of the elements contained within the grammars. For example, in FIG. 4B, assigning the highest priority to the "In Use" grammar effectively assigns priority to each element contained within the "In Use" grammar. Client computer 130 uses this prioritized element data to respond to an audio input relating to a selection of an object contained within the GUI.

Client computer 130 also contains a standard speech recognition engine (SR engine) 155, such as a Microsoft™ SAPI-compliant SR engine. In one embodiment, extension module 140 contains SR engine 155. SR engine 155 produces a text stream from an audio input using dictionaries or phonetic recognition patterns. In one embodiment, client computer 130 loads or registers the stored voice commands against a standard SR engine 155. SR engine 155 then produces a text stream that matches a registered voice command. Extension module 140 uses the text stream to determine the selected object as enumerated below.

The selectable objects may have actions or functions associated with them that are performed upon their selection, such as the opening or closing of an application, or an action within the screen area. In one embodiment, extension module 140 contains an event handler 160 to enable the performance of an operation related to the speech interface prior to performing the action associated with an object selection. Event handler 160 replaces the function, or action, with an extension module function for performing an operation related to the speech interface. The extension module function is then set to call the previously replaced function upon completion of the operation related to the speech interface. For example, upon selection of a button, extension module 140 could produce highlighting prior to performing the action associated with the button selection. In another embodiment, event handler 160 also enables the performance of an operation related to the speech interface after performing the action associated with an object selection. For instance, upon selection of a button, extension module 140 could adjust screen area priorities after performing the action associated with the button selection.

In another embodiment, extension module 140 also contains a change detector 165 to monitor a screen area's content and to detect changes so that prioritization module 150 can account for the elements associated with a GUI. For instance, upon the selection of a button, change detector 165 would detect changes made to the content of a screen area. Upon detecting changes, parser 145 would re-parse the content and prioritization module 150 would update data structures for that screen area.

Figure 5:
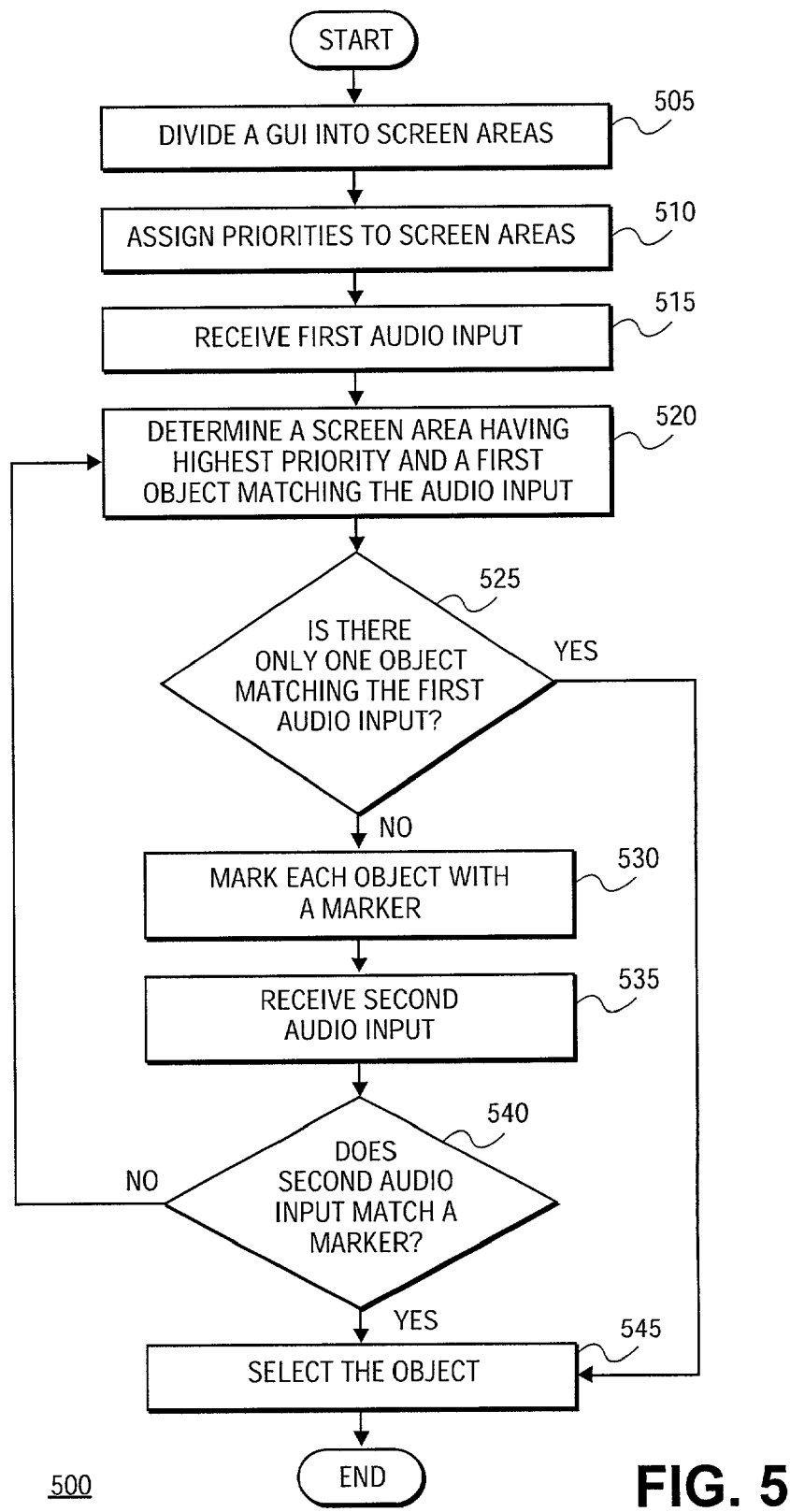
FIG. 5. is a flow diagram of the sequence of operations for providing a speech interface for a GUI in accordance with an example implementation of the present invention.

FIG. 5 depicts a flow diagram 500 of a sample sequence of operations for providing a speech interface for a GUI which are consistent with the present invention. In one embodiment, computer 130 creates a GUI containing selectable objects by using HTML. First, the system divides the GUI into screen areas (Step 505). Next, the system assigns priorities to the screen areas (Step 510). After receiving a first audio input (Step 515), the system determines the highest priority screen area that contains an object matching the first audio input (Step 520). Next, the system determines whether that screen area contains only one object that matches the first audio input (Step 525). If so, the system selects the matching object (Step 545). If not, the system marks each matching object within that screen area with a marker (Step 530). The system then receives a second audio input (Step 535) and determines whether the second audio input matches one of the markers (Step 540). If so, the system selects the object marked by the matching marker (Step 545). If not, the system determines the highest priority screen area containing an object matching the second audio input (Step 520).

As explained above, the system divides the GUI 300 into five screen areas: "Departing" area 305, "Arriving" area 310, "In Use" area 315, "Workplace Favorites" area 320, and "Roles" area 325. Prioritization module 150 assigns the screen areas a priority. For instance, "Departing" area 305 could have the highest priority, "Arriving" area 310 could have second priority, "In Use" area 315 third priority and so on. There are two objects marked "Friday," one within "Departing" area 305 and one within "Arriving" area 310, and three objects marked "Airlines," two within "In Use" area 315 and one within "Roles" area 325.

If, for example, the user says "Friday," the system first looks for a matching object in the highest priority area, "Departing" area 305. Since there is an object matching "Friday" here, the object is selected and the corresponding action is performed for that object. Although an object matching "Friday" also resides within the "Arriving" area 310, the "Departing" area 305 is the screen area from which the object is selected because "Departing" area 305 has a higher priority than "Arriving" area 310.

If, on the other hand, the user says "Airlines," the system first looks for a matching object in the highest priority area, "Departing" area 305. Since no object matches "Airlines" in that area, the system looks for a match in the next highest priority area, "Arriving" area 310. Again, no object in "Arriving" area 310 matches "Airlines," so the system continues to look for a match in the other areas in order of their priority. The system finally finds a matching object in "In Use" area 315. Although an object matching "Airlines" lies within "Roles" area 325, the system selects the object from "In Use" area 315 because the "In Use" area 315 has a higher priority than "Roles" area 325.

There are two instances of "Airlines" in "In Use" area 315, however, so the system presents markers, such as semi-transparent, numbered icons, to allow the user to select one of the instances. These types of semi-transparent, numbered icons may be referred to as 'Representational Enumerated Semi-transparent Overlaid Labels for Voice' (RE-SOLV) icons from SAP. The user selects one of the "Airlines" objects by saying the number on the associated marker.

As described in detail above, methods and apparatus consistent with the invention provide a speech interface for a GUI. The foregoing description of an implementation of the invention has been presented for purposes of illustration and description. Modifications and variations are possible in light of the above teachings or may be acquired from practicing the invention. For example, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM.

The scope of the invention is therefore defined by the following claims and their equivalents.

What is claimed is:

1. A method for providing speech control to a graphical user interface (GUI) containing objects to be selected, the method comprising:
   dividing the GUI into a plurality of screen areas;
   assigning priorities to the screen areas;
   receiving a first audio input relating to the selection of one of the objects in the GUI;
   determining the one of the screen areas that has the highest priority and includes a first object matching the first audio input; and
   selecting the first object, if the determined screen area only contains one object matching the first audio input; and
   using a second input to select one of the objects that matches the first audio input in the determined screen area, if the determined screen area contains more than one object that matches the first audio input.

2. The method of claim 1, wherein using a second input includes:
   marking each object matching the first audio input;
   receiving a second audio input relating to the selection of one of the marked objects; and
   selecting the marked object that best matches the second audio input.

3. The method of claim 2, further comprising removing the markers.

4. The method of claim 2, wherein marking the objects includes marking the objects with icons.

5. The method of claim 4, wherein marking the objects with the icons includes marking the objects with semi-transparent icons.

6. The method of claim 5, wherein marking the objects with semi-transparent icons includes marking the objects with semi-transparent icons that overlap the objects.

7. The method of claim 6, wherein marking the objects with semi-transparent icons that overlap the objects includes marking the objects with semi-transparent icons that have numbered labels.

8. The method of claim 1, wherein assigning priorities to the screen areas includes assigning priorities to the screen areas based on usage.

9. The method of claim 1, wherein assigning priorities to the screen areas includes assigning adjustable priorities to the screen areas.

10. The method of claim 1, further comprising indicating the one of the screen areas having the highest priority.

11. The method of claim 10, wherein indicating the highest priority screen area includes indicating the highest priority screen area with a visual output.

12. The method of claim 11, wherein indicating the highest priority screen area with visual output includes indicating the highest priority screen area with a visual output that includes highlighting.

13. The method of claim 1, further comprising confirming the receipt of the first audio input.

14. The method of claim 13, wherein confirming the receipt of the first audio input includes confirming the receipt of the first audio input with an audio output.

15. A method for using a graphical user interface (GUI), the method comprising:
   receiving a first audio input relating to the selection of one of the objects in the GUI;
   determining the one of the screen areas that has the highest priority and includes a first object matching the first audio input;
   selecting the first object, if the determined screen area only contains one object matching the first audio input; and
   using a second input to select one of the objects that matches the first audio input in the determined screen area, if the determined screen area contains more than one object that matches the first audio input.

16. An apparatus for providing speech control to a graphical user interface (GUI) containing objects to be selected, the apparatus comprising:
   at least one memory having program instructions; and
   at least one processor configured to use the program instructions to perform the operations of:
      dividing the GUI into a plurality of screen areas;
      assigning priorities to the screen areas;
      receiving a first audio input relating to the selection of one of the objects in the GUI;
      determining the one of the screen areas that has the highest priority and includes a first object matching the first audio input;
      selecting the first object, if the determined screen area only contains one object matching the first audio input; and,
      using a second input to select one of the objects that matches the first audio input in the determined screen area, if the determined screen area contains more than one object that matches the first audio input.

17. The apparatus of claim 16, wherein using a second input includes:
   marking each object matching the first audio input;
   receiving a second audio input relating to the selection of one of the marked objects; and
   selecting the marked object that best matches the second audio input.

18. The apparatus of claim 17, wherein the operations further comprise removing the markers.

19. The apparatus of claim 17, wherein marking the objects includes marking the objects with icons.

20. The apparatus of claim 19, wherein marking the objects with the icons includes marking the objects with semi-transparent icons.

21. The apparatus of claim 20, wherein marking the objects with semi-transparent icons includes marking the objects with semi-transparent icons that overlap the objects.

22. The apparatus of claim 21, wherein marking the objects with semi-transparent icons that overlap the objects includes marking the objects with semi-transparent icons that have numbered labels.

23. The apparatus of claim 16, wherein assigning priorities to the screen areas includes assigning priorities to the screen areas based on usage.

24. The apparatus of claim 16, wherein assigning priorities to the screen areas includes assigning adjustable priorities to the screen areas.

25. The apparatus of claim 16, wherein the operations further comprise indicating the one of the screen areas having the highest priority.

26. The apparatus of claim 25, wherein indicating the highest priority screen area includes indicating the highest priority screen area with a visual output.

27. The apparatus of claim 26, wherein indicating the highest priority screen area with visual output includes indicating the highest priority screen area with a visual output that includes highlighting.

28. The apparatus of claim 16, wherein the operations further comprise confirming the receipt of the first audio input.

29. The apparatus of claim 28, wherein confirming the receipt of the first audio input includes confirming the receipt of the first audio input with an audio output.

30. An apparatus for providing speech control to a graphical user interface (GUI)
containing objects to be selected, the apparatus comprising:
at least one memory having program instructions; and
at least one processor configured to use the program instructions to perform the operations of:
receiving a first audio input relating to the selection of one of the objects in the GUI;
determining the one of the screen areas that has the highest priority and includes a first object matching the first audio input;
selecting the first object, if the determined screen area only contains one object matching the first audio input; and
using a second input to select one of the objects that matches the first audio input in the determined screen area, if the determined screen area contains more than one object that matches the first audio input.

31. A system for providing speech control to a graphical user interface (GUI) containing objects to be selected, comprising:
means for dividing the GUI into a plurality of screen areas;
means for assigning priorities to the screen areas;
means for receiving a first audio input relating to the selection of one of the objects in the GUI;
means for determining the one of the screen areas that has the highest priority and includes a first object matching the first audio input;
means for selecting the first object, if the determined screen area only contains one object matching the first audio input, and
means for using a second input to select one of the objects that matches the first audio input in the determined screen area, if the determined screen area contains more than one object that matches the first audio input.

32. The system of claim 31, wherein the means for using a second input includes:
means for marking each object matching the first audio input;
means for receiving a second audio input relating to the selection of one of the marked objects; and
means for selecting the marked object that best matches the second audio input.

33. The system of claim 32, further comprising means for removing the markers.

34. The system of claim 32, wherein the markers include icons.

35. The system of claim 34, wherein the icons are semi-transparent.

36. The system of claim 35, wherein the icons overlap the objects matching the audio input.

37. The system of claim 36, wherein the icons includes numbered labels.

38. The system of claim 31, wherein the priorities of the screen areas are based on usage.

39. The system of claim 31, wherein the priorities of the screen areas are adjustable.

40. The system of claim 31, further comprising means for indicating the one of the screen areas having the highest priority.

41. The system of claim 40, wherein the means for indicating the highest priority screen area includes means for indicating the highest priority screen area with a visual output.

42. The system of claim 41, wherein the means for indicating the highest priority screen area includes means for indicating the highest priority screen area with a visual output that includes highlighting.

43. The system of claim 31, further comprising means for confirming the receipt of the first audio input.

44. The system of claim 43, wherein the means for confirming the receipt of the first audio input includes means for generating an audio output.

45. A system for providing speech control to a graphical user interface (GUI) containing objects to be selected, comprising:
means for receiving a first audio input relating to the selection of one of the objects in the GUI;
means for determining the one of the screen areas that has the highest priority and includes a first object matching the first audio input;
means for selecting the first object, if the determined screen area only contains one object matching the first audio input; and
means for using a second input to select one of the objects that matches the first audio input in the determined screen area, if the determined screen area contains more than one object that matches the first audio input.

46. A computer readable medium containing instructions for controlling a computer system to perform a method for providing speech control to a graphical user interface (GUI) containing objects to be selected, the method comprising:
dividing the GUI into a plurality of screen areas;
assigning Priorities to the screen areas;
receiving a first audio input relating to the selection of one of the objects in the GUI;
determining the one of the screen areas that has the highest priority and includes a first object matching the first audio input;
selecting the first object, if the determined screen area only contains one object matching the first audio input; and
using a second input to select one of the objects that matches the first audio input in the determined screen area, if the determined screen area contains more than one object that matches the first audio input.

47. The computer readable medium of claim 46, wherein using a second input includes:
marking each object matching the first audio input;
receiving a second audio input relating to the selection of one of the marked objects; and
selecting the marked object that best matches the second audio input.

48. The computer readable medium of claim 47, wherein the method further comprises removing the markers.

49. The computer readable medium of claim 47, wherein marking the objects includes marking the objects with icons.

50. The computer readable medium of claim 49, wherein marking the objects with the icons includes marking the objects with semi-transparent icons.

51. The computer readable medium of claim 50, wherein marking the objects with semi-transparent icons includes marking the objects with semi-transparent icons that overlap the objects.

52. The computer readable medium of claim 51, wherein marking the objects with semi-transparent icons that overlap the objects includes marking the objects with semi-transparent icons that have numbered labels.

53. The computer readable medium of claim 46, wherein assigning priorities to the screen areas includes assigning priorities to the screen areas based on usage.

54. The computer readable medium of claim 46, wherein assigning priorities to the screen areas includes assigning adjustable priorities to the screen areas.

55. The computer readable medium of claim 46, wherein the method further comprises indicating the one of the screen areas having the highest priority.

56. The computer readable medium of claim 55, wherein indicating the highest priority screen area includes indicating the highest priority screen area with a visual output.

57. The computer readable medium of claim 56, wherein indicating the highest priority screen area with visual output includes indicating the highest priority screen area with a visual output that includes highlighting.

58. The computer readable medium of claim 46, wherein the method further comprises confirming the receipt of the first audio input.

59. The computer readable medium of claim 58, wherein confirming the receipt of the first audio input includes confirming the receipt of the first audio input with an audio output.

60. A computer readable medium containing instructions for controlling a computer system to perform a method for providing speech control to a graphical user interface (GUI) containing objects to be selected, the method comprising:
receiving a first audio input relating to the selection of one of the objects in the GUI;
determining the one of the screen areas having the highest priority and including a first object matching the first audio input;
selecting the first object, if the determined screen area only contains one object matching the first audio input; and
using a second input to select one of the objects that matches the first audio input in the determined screen area, if the determined screen area contains more than one object that matches the first audio input.

61. An apparatus for providing speech control to a graphical user interface (GUI) containing objects to be selected the apparatus comprising:
means for dividing the GUI into a Plurality of screen areas;
means for assigning priorities to the screen areas;
means for receiving a first audio input relating to the selection of one of the objects in the GUI;
means for determining the one of the screen areas that has the highest priority and includes a first object matching the first audio input;
means for selecting the first object, if the determined screen area only contains one object matching the first audio input; and
means for using a second input to select one of the objects that matches the first audio input in the determined screen area, if the determined screen area contains more than one object that matches the first audio input.

62. The apparatus of claim 61, wherein the means for using a second input includes:
means for marking each object matching the first audio input;
means for receiving a second audio input relating to the selection of one of the marked objects; and
means for selecting the marked object that best matches the second audio input.

63. The apparatus of claim 62, further comprising means for removing the markers.

64. The apparatus of claim 62, wherein the markers include icons.

65. The apparatus of claim 64, wherein the icons are semi-transparent.

66. The apparatus of claim 65, wherein the icons overlap the objects matching the audio input.

67. The apparatus of claim 66, wherein the icons include numbered labels.

68. The apparatus of claim 61, wherein the priorities of the screen areas are based on usage.

69. The apparatus of claim 61, wherein the priorities of the screen areas are adjustable.

70. The apparatus of claim 61, further comprising means for indicating the one of the screen areas having the highest priority.

71. The apparatus of claim 70, wherein the means for indicating the highest priority screen area includes means for indicating the highest priority screen area with a visual output.

72. The apparatus of claim 71, wherein the means for indicating the highest priority screen area with visual output includes means for indicating the highest priority screen area with a visual output that includes highlighting.

73. The apparatus of claim 61, further comprising means for confirming the receipt of the first audio input.

74. The apparatus of claim 73, wherein confirming the receipt of the first audio input includes audio output.

75. An apparatus for providing speech control to a graphical user interface (GUI) containing objects to be selected, the apparatus comprising:
means for receiving a first audio input relating to the selection of one of the objects in the GUI;
means for determining the one of the screen areas that has the highest priority and includes a first object matching the first audio input;
means for selecting the first object, if the determined screen area only contains one object matching the first audio input; and
means for using a second input to select one of the objects that matches the first audio input in the determined screen area, if the determined screen area contains more than one object that matches the first audio input.

* * * * *